United States Patent
Cherubini

(10) Patent No.: US 9,871,756 B1
(45) Date of Patent: Jan. 16, 2018

(54) METHODS FOR DISPLAYING NOTIFICATIONS

(71) Applicant: GOOGLE INC., Mountain View, CA (US)

(72) Inventor: Mauro Cherubini, Zurich (CH)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 15/358,215

(22) Filed: Nov. 22, 2016

Related U.S. Application Data

(62) Division of application No. 14/179,608, filed on Feb. 13, 2014, now Pat. No. 9,531,651.

(51) Int. Cl.
*H04L 12/58* (2006.01)
*H04L 29/08* (2006.01)

(52) U.S. Cl.
CPC .............. *H04L 51/24* (2013.01); *H04L 51/20* (2013.01); *H04L 51/36* (2013.01); *H04L 67/18* (2013.01)

(58) Field of Classification Search
CPC ......... H04L 51/24; H04L 51/20; H04L 51/36; H04L 67/18
USPC ........................................................ 709/206
See application file for complete search history.

(56) References Cited

U.S. PATENT DOCUMENTS

| | | |
|---|---|---|
| 4,807,154 A | 2/1989 | Scully et al. |
| 4,817,018 A | 3/1989 | Cree et al. |
| 4,866,611 A | 9/1989 | Cree et al. |
| 5,050,077 A | 9/1991 | Vincent |
| 5,070,470 A | 12/1991 | Scully et al. |
| 5,093,901 A | 3/1992 | Cree et al. |
| 5,113,380 A | 5/1992 | Levine |
| 5,124,912 A | 6/1992 | Hotaling et al. |
| 5,261,045 A | 11/1993 | Scully et al. |
| 5,299,304 A | 3/1994 | Williams et al. |
| 5,323,314 A | 6/1994 | Baber et al. |

(Continued)

FOREIGN PATENT DOCUMENTS

| | | |
|---|---|---|
| EP | 1109121 A2 | 6/2001 |
| WO | 0205065 A2 | 1/2002 |

OTHER PUBLICATIONS

Balderston, Jim, "Fulcrum Boosts Middleware Links to Web", InfoWorld, vol. 18, No. 25. Jun. 17, 1996.

(Continued)

*Primary Examiner* — Nicholas Taylor
*Assistant Examiner* — Chong G Kim
(74) *Attorney, Agent, or Firm* — Young Basile Hanlon & MacFarlane, P.C.

(57) ABSTRACT

Delivering notifications to a user can include obtaining, by one or more server computers, notification information indicating that a notification is to be delivered to a device associated with the user at a future time that is subsequent to a current time and behavior information associated with the user; ranking, by the one or more server computers, a plurality of notification delivery strategies that the user will be available to receive the notification from the device associated with the user at the future time based in part on behavior information associated with the user; and sending the notification for display to the device associated with the user based on a highest ranked delivery strategy from the plurality of delivery strategies.

20 Claims, 6 Drawing Sheets

(56) References Cited

U.S. PATENT DOCUMENTS

| | | | |
|---|---|---|---|
| 5,513,323 A | 4/1996 | Williams et al. |
| 5,530,852 A | 6/1996 | Meske, Jr. et al. |
| 5,692,125 A | 11/1997 | Schloss et al. |
| 5,732,399 A | 3/1998 | Katiyar et al. |
| 5,745,360 A | 4/1998 | Leone et al. |
| 5,774,867 A | 6/1998 | Fitzpatrick et al. |
| 5,842,177 A | 11/1998 | Haynes et al. |
| 5,867,822 A | 2/1999 | Sankar |
| 5,933,810 A | 8/1999 | Okawa |
| 5,963,913 A | 10/1999 | Henneuse et al. |
| 6,016,478 A | 1/2000 | Zhang et al. |
| 6,101,480 A | 8/2000 | Conmy et al. |
| 6,167,379 A | 12/2000 | Dean et al. |
| 6,216,110 B1 | 4/2001 | Silverberg |
| 6,370,566 B2 | 4/2002 | Discolo et al. |
| 6,636,888 B1 | 10/2003 | Bookspan et al. |
| 6,732,103 B1 | 5/2004 | Strick et al. |
| 6,781,920 B2 | 8/2004 | Bates et al. |
| 6,988,128 B1 | 1/2006 | Alexander et al. |
| 7,082,402 B2 | 7/2006 | Conmy et al. |
| 7,096,232 B2 | 8/2006 | Doss et al. |
| 7,222,156 B2 | 5/2007 | Gupta et al. |
| 7,283,970 B2 | 10/2007 | Cragun et al. |
| 7,299,193 B2 | 11/2007 | Cragun et al. |
| 7,334,018 B2 | 2/2008 | Elms |
| 7,343,313 B2 | 3/2008 | Dorenbosch et al. |
| 7,379,888 B1 | 5/2008 | Mahapatro |
| 7,395,221 B2 | 7/2008 | Doss et al. |
| 7,421,401 B2 | 9/2008 | Demsky et al. |
| 7,424,676 B1 | 9/2008 | Carlson et al. |
| 7,475,116 B2 * | 1/2009 | Hay .................. H04L 12/58 709/206 |
| 7,519,663 B1 | 4/2009 | Bostick et al. |
| 7,679,518 B1 | 3/2010 | Pabla et al. |
| 7,747,752 B2 | 6/2010 | Pedersen |
| 7,752,066 B2 | 7/2010 | Doss et al. |
| 7,865,387 B2 | 1/2011 | Mansour |
| 8,402,387 B1 * | 3/2013 | Iversen .............. G06Q 30/0242 715/789 |
| 8,731,523 B1 * | 5/2014 | Onnen .................. H04L 67/26 455/412.1 |
| 8,738,723 B1 | 5/2014 | Faaborg et al. |
| 9,165,285 B2 | 10/2015 | Schultz et al. |
| 2001/0014866 A1 | 8/2001 | Conmy et al. |
| 2001/0037229 A1 | 11/2001 | Jacobs et al. |
| 2001/0054072 A1 | 12/2001 | Discolo et al. |
| 2002/0049733 A1 | 4/2002 | Orlick |
| 2002/0087649 A1 | 7/2002 | Horvitz |
| 2002/0131565 A1 | 9/2002 | Scheuring et al. |
| 2002/0194246 A1 | 12/2002 | Moskowitz et al. |
| 2003/0061087 A1 | 3/2003 | Srimuang |
| 2003/0103415 A1 | 6/2003 | Bates et al. |
| 2003/0130882 A1 | 7/2003 | Shuttleworth et al. |
| 2003/0149605 A1 | 8/2003 | Cragun et al. |
| 2003/0149606 A1 | 8/2003 | Cragun et al. |
| 2003/0220795 A1 | 11/2003 | Arayasantiparb et al. |
| 2003/0233265 A1 | 12/2003 | Lee et al. |
| 2004/0064585 A1 * | 4/2004 | Doss ............... G06Q 10/063116 709/246 |
| 2004/0064733 A1 | 4/2004 | Gong |
| 2004/0078436 A1 | 4/2004 | Demsky et al. |
| 2004/0088362 A1 | 5/2004 | Curbow et al. |
| 2004/0093290 A1 | 5/2004 | Doss et al. |
| 2004/0111307 A1 | 6/2004 | Demsky et al. |
| 2004/0128304 A1 | 7/2004 | Rokosz |
| 2004/0128359 A1 | 7/2004 | Horvitz et al. |
| 2004/0172450 A1 | 9/2004 | Edelstein et al. |
| 2004/0193458 A1 | 9/2004 | Bear |
| 2004/0194110 A1 | 9/2004 | McKee et al. |
| 2004/0221010 A1 | 11/2004 | Butler |
| 2004/0249776 A1 | 12/2004 | Horvitz et al. |
| 2004/0261013 A1 | 12/2004 | Wynn et al. |
| 2005/0038687 A1 | 2/2005 | Galdes |
| 2005/0065832 A1 | 3/2005 | Virta |
| 2005/0091095 A1 | 4/2005 | Wilbrink et al. |
| 2005/0193145 A1 | 9/2005 | Brown et al. |
| 2005/0202817 A1 | 9/2005 | Sudit |
| 2005/0234990 A1 | 10/2005 | Brighouse et al. |
| 2005/0256754 A1 | 11/2005 | Nastacio |
| 2005/0273372 A1 | 12/2005 | Bowne et al. |
| 2005/0288987 A1 | 12/2005 | Sattler et al. |
| 2006/0031326 A1 | 2/2006 | Ovenden |
| 2006/0047557 A1 | 3/2006 | Bieselin et al. |
| 2006/0047577 A1 | 3/2006 | Dietz et al. |
| 2006/0075228 A1 | 4/2006 | Black et al. |
| 2006/0123011 A1 | 6/2006 | Stillion et al. |
| 2006/0184885 A1 | 8/2006 | Hayes et al. |
| 2006/0195526 A1 | 8/2006 | Lederer et al. |
| 2006/0218027 A1 | 9/2006 | Carrion |
| 2006/0253537 A1 * | 11/2006 | Thomas ............... G06Q 10/107 709/206 |
| 2006/0293943 A1 | 12/2006 | Tischhauser et al. |
| 2007/0004385 A1 * | 1/2007 | Horvitz .................. H04L 51/14 455/414.1 |
| 2007/0005409 A1 | 1/2007 | Boss et al. |
| 2007/0008911 A1 | 1/2007 | MacFarlane et al. |
| 2007/0011314 A1 * | 1/2007 | Horvitz ............... G06Q 10/107 709/224 |
| 2007/0022075 A1 | 1/2007 | Horvitz et al. |
| 2007/0071209 A1 | 3/2007 | Horvitz et al. |
| 2007/0143425 A1 | 6/2007 | Kieselbach et al. |
| 2007/0180354 A1 | 8/2007 | Rivers-Moore et al. |
| 2007/0214228 A1 * | 9/2007 | Horvitz ............... G06Q 10/107 709/207 |
| 2007/0239509 A1 | 10/2007 | Kaminsky et al. |
| 2007/0250366 A1 | 10/2007 | Nurmi |
| 2007/0282654 A1 | 12/2007 | Sarkar |
| 2008/0033778 A1 | 2/2008 | Boss et al. |
| 2008/0046514 A1 | 2/2008 | Daughtry et al. |
| 2008/0091504 A1 | 4/2008 | Lyle et al. |
| 2008/0134041 A1 | 6/2008 | Zinn |
| 2008/0162250 A1 | 7/2008 | Carrion |
| 2008/0189624 A1 | 8/2008 | Chotai et al. |
| 2008/0243582 A1 | 10/2008 | Chen et al. |
| 2008/0312948 A1 * | 12/2008 | Kalliola ............... G06Q 10/06 705/14.49 |
| 2009/0125818 A1 | 5/2009 | Ritter et al. |
| 2009/0138283 A1 | 5/2009 | Brown |
| 2009/0164911 A1 | 6/2009 | Cox et al. |
| 2009/0177601 A1 * | 7/2009 | Huang .................. G06Q 10/10 706/16 |
| 2010/0151918 A1 | 6/2010 | Annambhotla et al. |
| 2010/0217644 A1 | 8/2010 | Lyle et al. |
| 2010/0250336 A1 * | 9/2010 | Selinger ................ G06Q 30/02 705/26.7 |
| 2010/0312838 A1 * | 12/2010 | Lyon .................... G06Q 10/109 709/206 |
| 2011/0130958 A1 * | 6/2011 | Stahl ..................... G01C 21/362 701/533 |
| 2011/0137954 A1 * | 6/2011 | Diaz ..................... G06Q 10/00 707/803 |
| 2011/0148632 A1 * | 6/2011 | Chin .................... G06Q 10/109 340/540 |
| 2011/0258153 A1 | 10/2011 | Kamar et al. |
| 2012/0023454 A1 | 1/2012 | Pieruschka |
| 2012/0054187 A1 * | 3/2012 | Priyadarshan .... G06F 17/30867 707/740 |
| 2012/0164997 A1 * | 6/2012 | Iyer ....................... G06Q 10/109 455/414.2 |
| 2012/0166075 A1 * | 6/2012 | Agrawal ............. G06Q 10/1095 701/414 |
| 2013/0218825 A1 * | 8/2013 | Zhang ................... G06Q 30/02 706/52 |
| 2013/0325755 A1 * | 12/2013 | Arquette ................. H04L 51/32 706/12 |
| 2014/0006611 A1 | 1/2014 | Perez |
| 2014/0057644 A1 * | 2/2014 | Chetlur ................. H04L 5/0085 455/452.2 |
| 2014/0129661 A1 * | 5/2014 | Thyagaraja ............ G06F 9/542 709/207 |
| 2014/0173445 A1 * | 6/2014 | Grassiotto ......... H04M 1/72566 715/736 |

(56) References Cited

U.S. PATENT DOCUMENTS

| | | | |
|---|---|---|---|
| 2014/0188595 A1* | 7/2014 | Jacobs | G06Q 30/0244 705/14.43 |
| 2014/0189111 A1 | 7/2014 | Ahola | |
| 2014/0235282 A1 | 8/2014 | Kansal et al. | |
| 2014/0278057 A1* | 9/2014 | Berns | G01C 21/3484 701/410 |
| 2014/0372525 A1* | 12/2014 | Raghavan | H04L 65/1069 709/204 |
| 2015/0081817 A1* | 3/2015 | Jeon | H04L 67/26 709/206 |
| 2015/0141055 A1* | 5/2015 | Barrand | H04W 4/02 455/456.3 |
| 2015/0143281 A1* | 5/2015 | Mehta | G06Q 10/10 715/781 |
| 2016/0170991 A1* | 6/2016 | Birchall | G06F 17/3053 707/751 |
| 2016/0315902 A1* | 10/2016 | Silva | H04L 67/306 |

OTHER PUBLICATIONS

Fulcrum's Surfboard—Search Technology for Internet, Newsbytes Inc., Mar. 23, 1995.

Gage, Deborah, "Fulcrum Technologies Tries to stay ahead of Microsoft", Computer Reseller News, 1996.

Gustavson, Ron, "Compact Disc and Portable Webs", E Media Professional, vol. 9, No. 12, Dec. 1996.

Kramer, Matt, "Tests Find Notes Client Will Ease Wandering, Database Access", PC Week, vol. 14, No. 21, May 26, 1997.

Oski, Jonathan A., Lotus Notes 4.5 Branches into Internet, Intranets, MacWeek, vol. 11, No. 8, Feb. 24, 1997.

Participation Status on Computer Calendar Systems, Research Disclosure, No. 298 Feb. 1989. Kenneth Mason Publications Ltd.

* cited by examiner

METHODS FOR DISPLAYING NOTIFICATIONS

CROSS-REFERENCE TO RELATED APPLICATION(S)

This application claims priority to and the benefit of U.S. application patent Ser. No. 14/179,608, filed Feb. 13, 2014, the entire disclosure of which is hereby incorporated by reference.

BACKGROUND

The disclosure herein relates generally to methods for displaying notifications.

Many computing systems and applications use notifications as a way to communicate with the user and provide functionalities and feedback. Typical notifications systems, upon determining that a condition is met, output a message that can be displayed to a user. Notification messages can be output, as examples, via email, or via a popup message that is displayed by the user interface of an application or operating system.

One example of a notification is a reminder for a calendar event. The user creates a calendar event in a calendar application. The calendar application is configured to deliver a reminder for the event some time before the event starts. This can be useful to help the user to recall that the event is happening and plan to reach the location of the event on time. Another example of a notification can be a task reminder that is output by a task management system.

Many notifications are not effective, in that they are not displayed to and/or perceived by the user at the correct time. As one example, a notification might be ineffective because it is delivered in the midst of many other notifications and is not noticed. As another example, a notification might be ineffective because the user is away from the device that is delivering the notification when the notification is triggered. As another example, the notification might be ineffective because the device that should deliver the notification to the user is off (e.g., because lack of power or because the device is silenced or turned off). As another example, the notification might be ineffective because the notification is delivered via a network (e.g. the internet), and the device that should notify the user is not connected to the network (e.g., the device is in a geographical location where the network is not available). In these types of situations, the notification may not be delivered to the user at the appropriate time, causing the information contained in the notification to become completely useless. For instance, receiving a reminder for an event after the event has happened is not useful.

SUMMARY

The disclosure relates to methods for displaying notifications.

One aspect of the disclosed embodiments is a method for delivering notifications to a user. The method includes obtaining, by one or more server computers, notification information indicating that a notification is to be delivered to a device associated with the user at a future time that is subsequent to a current time and behavior information associated with the user. The method also includes ranking, by the one or more server computers, a plurality of notification delivery strategies that the user will be available to receive the notification from the device associated with the user at the future time based in part on the behavior information associated with the user. The method also includes sending the notification for display to the device associated with the user based on a highest ranked delivery strategy from the plurality of delivery strategies.

Another aspect of the disclosed embodiments is an apparatus that includes one or more processors and one or more memory devices for storing program instructions used by the one or more processors. The program instructions, when executed by the one or more processors, cause the one or more processors to obtain information regarding a notification to be delivered to a device associated with a user at a future time that is subsequent to a current time, obtain behavior information associated with the user, rank a plurality of notification delivery strategies based in part on the behavior information, and deliver the notification to the device associated with the user based on a highest ranked delivery strategy from the plurality of delivery strategies.

BRIEF DESCRIPTION OF THE DRAWINGS

The description herein makes reference to the accompanying drawings wherein like reference numerals refer to like parts throughout the several views, and wherein.

DETAILED DESCRIPTION

Methods for displaying notifications are taught herein. The disclosure herein relates to methods, systems, and apparatuses for displaying notifications, wherein the likelihood that the notifications are displayed to and/or perceived by the user at an appropriate time is enhanced. In the methods, systems, and apparatuses herein, notifications that are scheduled for delivery at a future time are analyzed, and if it is likely that the notification will not be displayed to the user or perceived by the user at the time scheduled, delivery of the notification is modified to increase the likelihood that the notification will be displayed to the user and perceived by the user.

Figure 1:
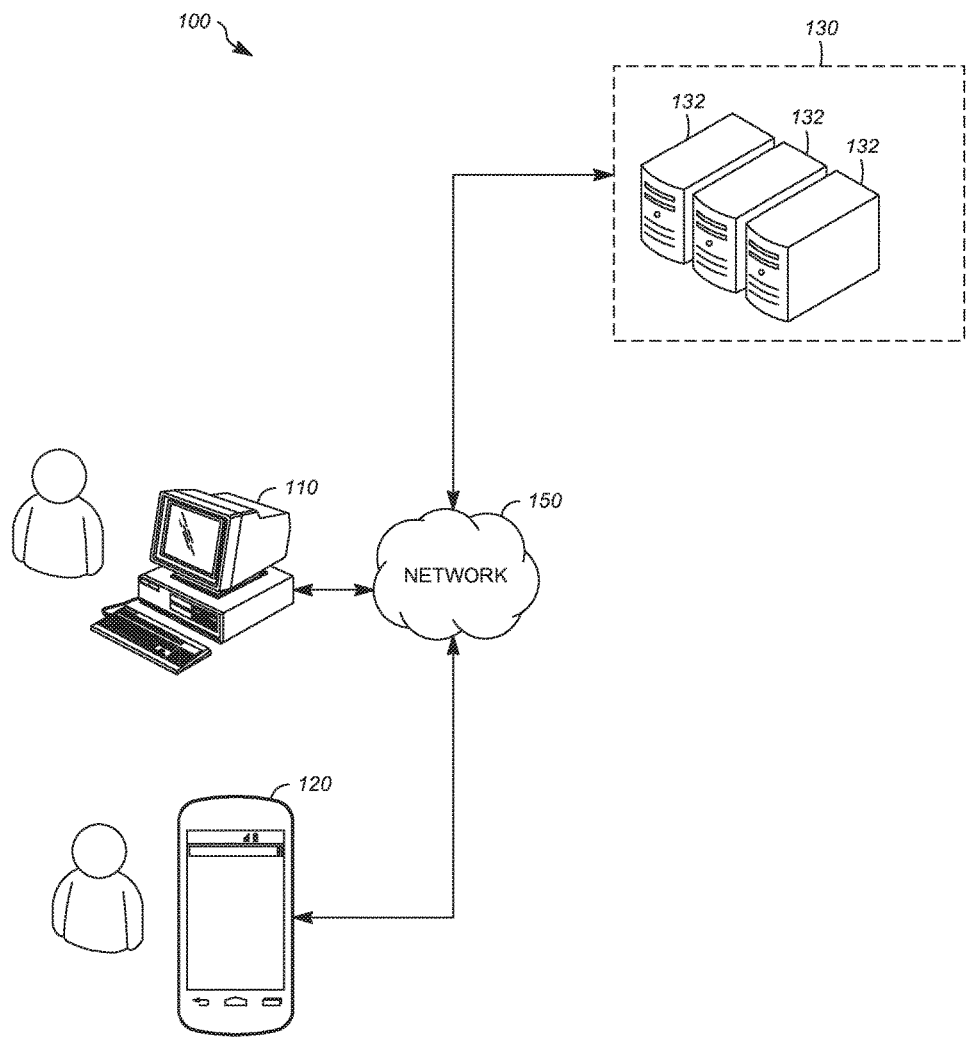
FIG. 1 is a block diagram showing an example of an environment in which a system for displaying object history information can be implemented.

FIG. 1 shows an example of an environment 100 in which a system for displaying object history information can be implemented. The environment 100 can include a user system 110, one or more additional user systems 120, and an application hosting service 130. The user system 110 and the additional user systems 120 are each representative of a large number (e.g. millions) of systems that can be included in the environment 100, with each system being able to utilize one or more applications that are provided by the application hosting service 130. The user system 110 and the additional user systems 120 can each be any manner of computer or computing device, such as a desktop computer, a laptop computer, a tablet computer, or a smart-phone (a computationally-enabled mobile telephone). The application hosting service 130 can be implemented using one or more server computers 132. The user system 110, the additional user systems 120, and the application hosting service 130 can each be implemented as a single system, multiple systems, distributed systems, or in any other form.

The systems, services, servers, and other computing devices described here are in communication via a network 150. The network 150 can be one or more communications networks of any suitable type in any combination, including wireless networks, wired networks, local area networks, wide area networks, cellular data networks, and the internet.

The application hosting service 130 can provide access to one or more hosted applications to a defined group of users including operators associated with the user system 110 and the additional user systems 120. One or more of the hosted applications can be operable to output, for display to a user, one or more notifications. The notifications can be output by the application hosting service for display at a device associated with the user, such as the user system 110, by transmission of signals and/or data from the application hosting service to the user system 110 that, when interpreted by the user system 110, cause display of the notifications, such as by the operating system of the user system 110, or by an application that is executed by the user system 110.

Figure 2:
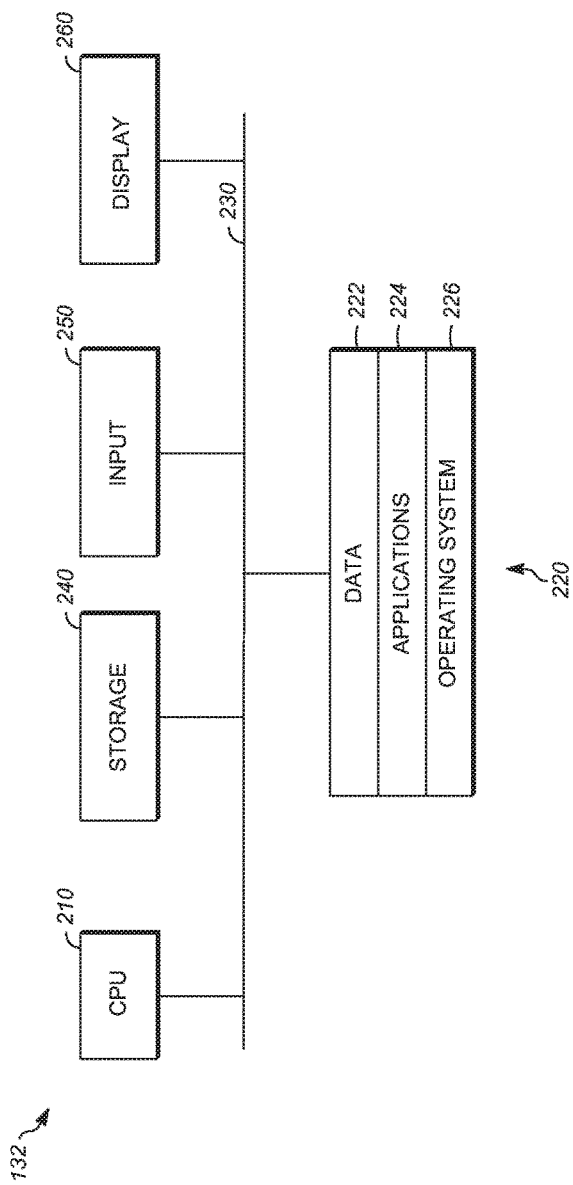
FIG. 2 is a block diagram showing an example of a hardware configuration for a server computer.

FIG. 2 is a block diagram of an example of a hardware configuration for the one or more server computers 132 of FIG. 1. The same hardware configuration or a similar hardware configuration can be used to implement the user system 110 and the additional user systems 120. Each server computer 132 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

Each server computer 132 can include memory 220, such as a random access memory device (RAM). Any other suitable type of storage device can also be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described here.

A storage device 240 can be optionally provided in the form of any suitable computer readable medium, such as a hard disc drive, a memory device, a flash drive, or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as a liquid crystal display (LCD) or a cathode-ray tube (CRT), allows output to be presented to a user, for example, in response to receiving a video signal.

Although FIG. 2 depicts the CPU 210 and the memory 220 of each server computer 132 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each of each server computer 132 can be composed of multiple buses. Further, the storage device 240 can be directly coupled to the other components of the respective server computer 132 or can be accessed via a network and can comprise a single integrated unit such as a memory card or multiple units such as multiple memory cards. The one or more server computers can thus be implemented in a wide variety of configurations.

Figure 3:
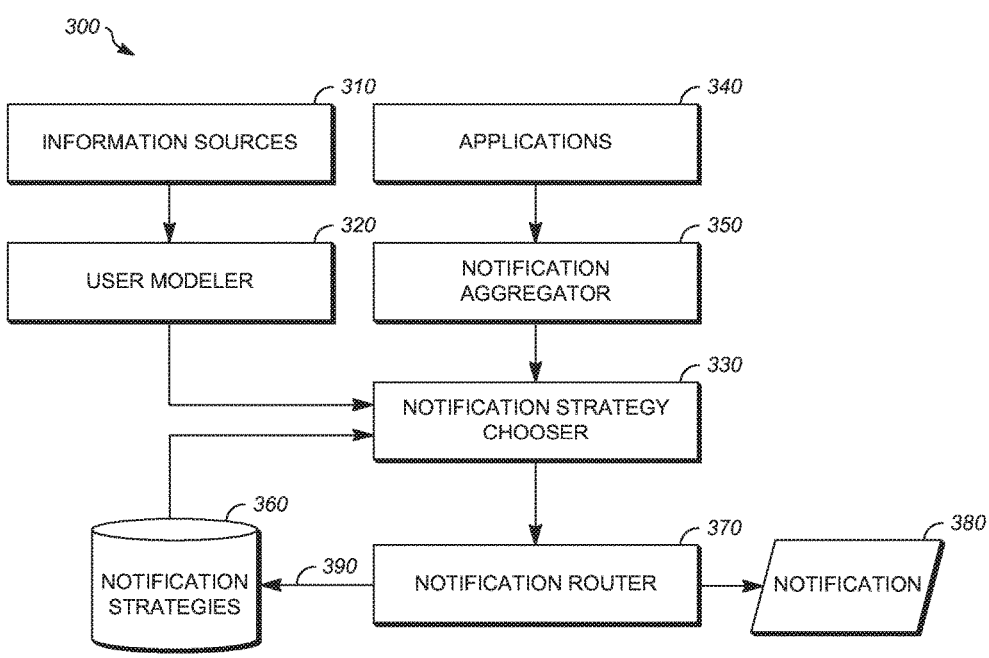
FIG. 3 is a block diagram showing a system for displaying notifications.

FIG. 3 is a block diagram showing an example of a system 300 for displaying notifications. The system 300 is operable to output signals and/or data, that when interpreted, cause notifications to be displayed to a user. As will be explained, the system 300 can build a user model based on multiple data sources, aggregate the user's upcoming notifications, and analyze and prioritize different delivery methods for the notifications based on the probability of being noticed by the user.

In the illustrated example, information is received from one or more information sources 310 and is provided to a user modeler 320. The information sources 310 can include one or more devices associated with the user, applications that are used by the user including applications executed by one or more devices associated with the user and/or applications hosted by one or more server computers such as the application hosting service 130, or any other suitable source of information. The information provided by the information sources 310 can be or include behavior information associated with the user, which describes, as examples, actions taken by the user, information describing usage patterns for one or more devices associated with the user, and/or historical geolocation information that describes the physical location or one or more devices that are associated with the user at certain prior points in time (e.g. mobility patterns for the user). Further examples of information associated with the user include data from applications such as calendar information, reminder information, email information, and information describing success or failure of previously attempted notifications. Information associated with the user also includes information received from devices associated with the user, such as information describing the state of charge of the battery for one or more devices, the volume of system sounds for one or more devices, and geolocation information describing the current physical location of the device from which the current physical location of the user is inferred. Numerous other types of information can be received from devices associated with the user reflecting the status of those devices.

The user modeler 320 receives the information from the information sources 310 as input and generates a user model that can output information describing the likely location and/or activity that the user is engaged in at the current time and at times subsequent to the current time. As used herein, user activities are the activities that the user engages in, and can include professional activities, recreational activities, personal activities, etc. User activities can include, as examples, working, sleeping, surfing the internet, dining, watching a movie in the cinema, attending a concert, in a doctor appointment, flying, etc. user activity is inferred using the information from the information sources 310. In one implementation, the information sources include calendar entries, the physical location of the user based on geolocation information from a device associated with the user, and the user's actions in online services, such as use of social media services, online file storage services, online document editing services, or other types of online services. Data collected in the past can be used to infer recurring patterns and project these patterns in the future. In addition, information sources such as calendar entries may exist that explicitly refer to future times.

The information generated by the user modeler 320 can be utilized to predict, such as by calculating a probability, whether the user will be available to receive a notification. For example, the user modeler 320 can output the activity which the user will most likely be involved in for a current time t and at subsequent times t+n, where n=1, 2, . . . , n and represents an increment such as minutes or hours. This information is provided to a notification strategy chooser 330 and is utilized in selecting strategies for delivering notifications.

Requests for display of notifications ("notification requests") are generated by one or more applications 340 and are provided to a notification aggregator 350. The notification requests can include information describing the application that sent the request, the content to be displayed in a notification, a time at which the notification is to be displayed, and/or any other suitable information. The notification aggregator 350 continuously checks for and/or receives notification requests from the applications 340. For example, the notification aggregator could receive from the applications 340 notification requests regarding notifications to be sent immediately at the current time t, and could also poll the applications 340 for information regarding notifications to be sent at a future time t+n. This can be done, for example, using application programming interfaces (APIs) that are provided by some or all of the application. The notification requests are aggregated and ordered by the notification aggregator 350. For example, the notifications requests can be ordered based on the time at which corresponding notifications are to be generated and delivered, such as by transmission of the corresponding notification to a device that is associated with the user. The notification requests can be stored in the form of a queue or list that is constantly updated by the notification aggregator 350 as new notifications are received.

The notification strategy chooser 330 receives information from the user modeler 320 and the notification aggregator 350 and selects a delivery strategy for delivering the corresponding notification to the users for one of the notification requests received from the notification aggregator 350. In one implementation, for each notification in the list or queue of notification requests that is compiled by the notification aggregator, the notification strategy chooser can calculate the probability of success for each of a plurality of delivery strategies, based on the information received from the user modeler 320. The notification strategy chooser 330 then chooses the delivery strategy with the highest probability score.

The delivery strategies are received from a notification strategy repository 360 of pre-existing notification strategies, each strategy being associated with a success rate that is updated based on the success or failure of each delivery. The success rate can be specific to the user, and/or can be based on information from deliveries to multiple users. In some implementations, success rates are tracked separately for each of the different activities or states that can be output by the user modeler 320.

The notification strategy repository 360 can, in one implementation, store each delivery strategy as a set of rules. A description of a delivery strategy might include alternative routing via an alternative device associated with the user. Other strategies might include employing different delivery times or different modalities. As one example, a notification strategy can include changing a system sound played when a notification is displayed in order to increase the likelihood that the notification is perceived by the user.

As one example, a notification that is due at time t+4 is normally delivered at time t+4. However, the notification strategy chooser 330 might select a notification strategy that delivers the notification at an earlier time or a later time based on the information received from the user modeler 320. As another example, a notification from a calendar application that is utilized on a first device, such as a computationally-enabled mobile telephone (i.e. a "smart phone") is normally delivered using the first device. In situations where, based on the information received from the user modeler 320, it is determined that the user is not likely to receive the message via the first device, the notification strategy chooser 330 might deliver the notification to a second device, such as via an operating system or application of a desktop computer. As another example, a different delivery strategy might also be preferred based on the amount of notifications that are delivered in the same timeframe. Thus, if too many notifications are delivered by the same method during a certain time period, the notification strategy chooser 330 might suggest a different strategy to avoid the same channel and maximizing the chances that the notification will be noticed by the user. For instance, a notification scheduled to be delivered by a pop-up message could instead be delivered by SMS or email.

The notification strategy chooser 330 outputs information describing or identifying the notification request and the selected notification strategy to a notification router 370. The notification router 370 delivers a notification 380 to the user using the notification strategy that was selected by the notification strategy chooser 330. As an example, the notification router 370 can generate the notification 380 based on the information received by the notification router, such as the notification request, and can deliver the notification 380, such as by transmission of data to one or more devices that are associated with the user, wherein the data, when interpreted, is operable to cause display of the notification at the one or more devices. The notification router 370 can also detect whether the notification has been read by the user. For example, the notification router can receive an indication from one of the user devices indicating that the user operated (e.g. clicked) an interface element that is associated with the notification. The notification router 370 then stores this information at the notification strategy repository 360, such as by transmitting a feedback message 380, thereby updating the success rate for the selected strategy under the current conditions.

Figure 4:
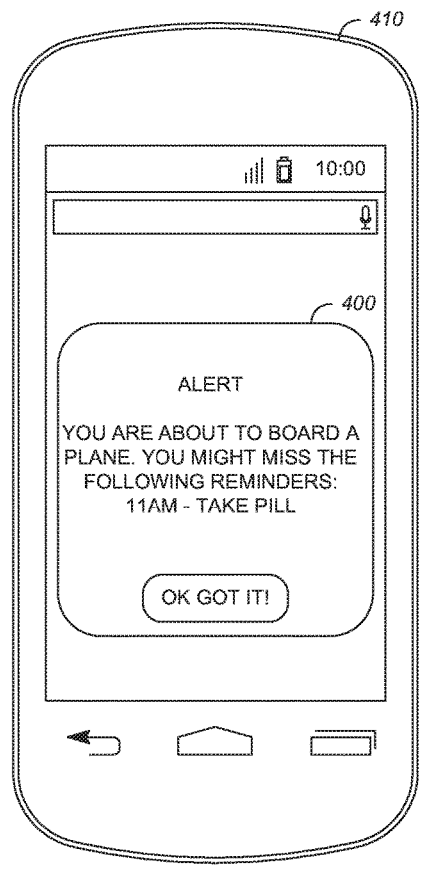
FIG. 4 is an illustration showing display of a first example notification message at a device associated with a user.

FIG. 4 is an illustration showing display of a first example notification message 400 at a first user device 410 that is associated with the user. This example pertains to a user that needs to take medication as a specified time every day. Using a reminder application, the user has scheduled a notification for display at the first user device 410 at the specified time. The system 300, using information from a source such as the user's calendar, email messages, or geolocation at an airport, has determined or inferred that the user is scheduled to board an airplane flight prior to the specified time making it likely that the first user device 410 will either be disconnected from communication via a network or will be off at the specified time, resulting in a low likelihood that the notification would be successfully delivered. The system 300 determines that an alternative notification strategy should be used, where the notification message 400 is displayed prior to the time at which the user is scheduled to board the flight, and thus, the notification is transmitted to the first user device 410 and is displayed.

Figure 5:
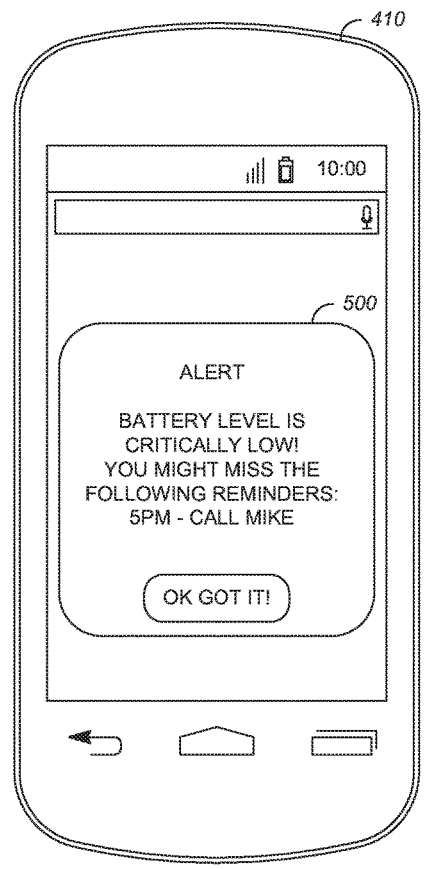
FIG. 5 is an illustration showing display of a second example notification message at the device associated with the user.

FIG. 5 is an illustration showing display of a second example notification message 500 at the first user device 410. In this example, the user has scheduled a phone conference at a specified time, such as by using a calendar application. The system 300 receives information indicating that the battery of the first user device 410 is critically low, and thus, calculates a low likelihood that the notification regarding the phone conference will be successfully received at the specified time. The system 300, in response, chooses a notification strategy that delivers the notification in advance of the specified time and at a time prior to when the first user device 410 is expected to become inoperable for lack of battery power, and the notification is transmitted to and displayed at the device.

Figure 6:
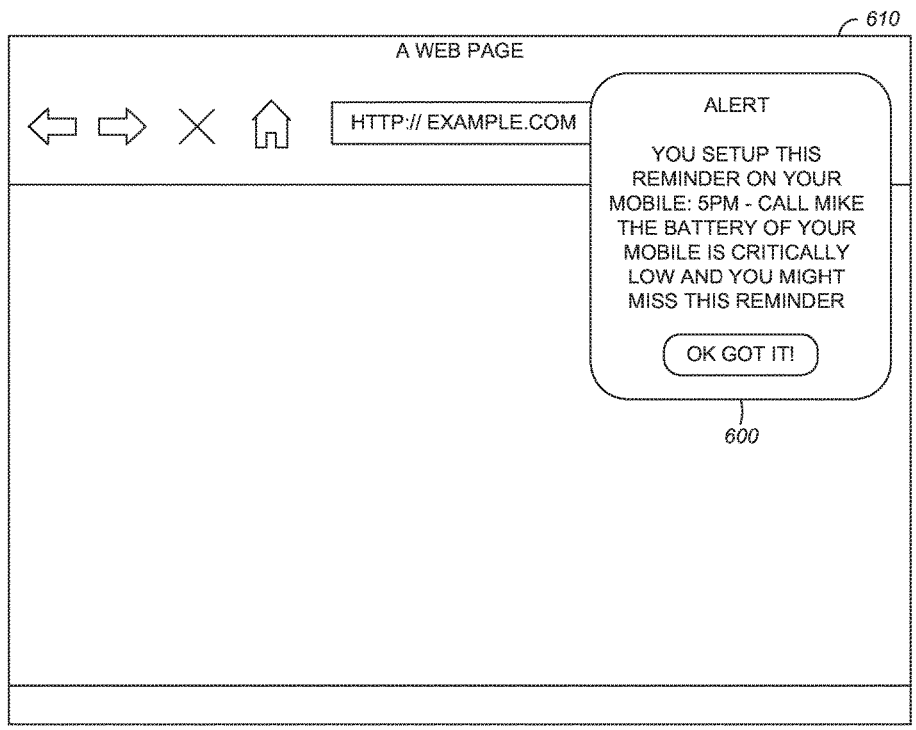
FIG. 6 is an illustration showing display of a third example notification message within an application that is executed by a computing device.

FIG. 6 is an illustration showing display of a third example notification message 600 within an application 610 that is executed by a second computing device such as a laptop computer or desktop computer. In this example, the notification is originally configured to be delivered at the first user device 410, but the system 300 has detected that the state of charge of the battery of the first user device 410 is critically low, based on state of charge information received from the first user device 410. The system 300 has further detected that the user is actively using the second computing device. In this example, the likelihood that the notification will be received at the first user device 410 is low, so the system routes the notification message 600 to the second device 600 as an alternative to or in addition to routing the message to the first user device 410.

Figure 7:
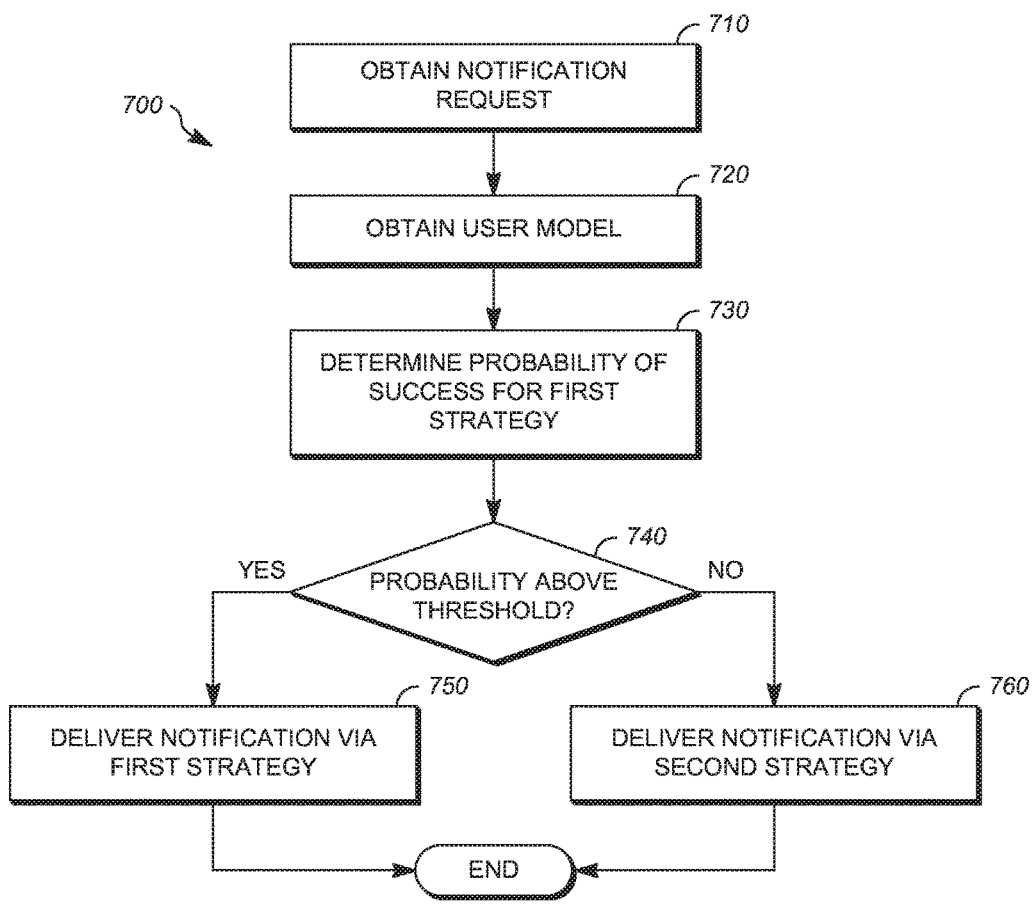
FIG. 7 is a flowchart showing a first example of a process for displaying notifications.

FIG. 7 is a flowchart showing a process 700 for displaying notifications. The operations described in connection with the process 700 can be performed at one or more computers, such as at the one or more server computers 132 of the application hosting service 130. When an operation is performed by one or more computers, it is completed when it is performed by one computer. The operations described in connection with the process 700 can be embodied as a non-transitory computer readable storage medium including program instructions executable by one or more processors that, when executed, cause the one or more processors to perform the operations. For example, the operations described in connection with the process 700 could be stored at the memory 220 of one of the server computers 132 and be executable by the CPU 210 thereof.

In operation 710, a notification request is obtained. As used herein, obtain encompasses any manner in which signals or data are made available to a computing device and/or a processor, such as receiving by network transmission, retrieving from RAM, reading from a storage device, or receiving an input from a human machine interface. Operation 710 can include obtaining, at one or more computers, information regarding a notification to be delivered to a device associated with a user. The notification request can, in some examples, specify any or all of a time for delivery, a device to make delivery to, or a delivery method. As an example, a notification request can be obtained as described with respect to the notification strategy chooser 330.

In operation 720, information associated with the user is obtained, such as the user model as described with respect to the user modeler 320. For example, information associated with the user can be obtained by the notification strategy chooser 330 from the user modeler 320 as previously described.

In operation 730 a determination is made as to whether delivery of the notification using a first notification strategy will be successful. The determination can be made in the form of a probability of success. The determination can be made as described with respect to the notification strategy chooser 330.

In operation 740, the probability or likelihood computed at operation 730 is compared to a threshold. In one example, the threshold is a predetermined value. In another example, the threshold is a calculated value. For instance, the threshold can be a likelihood of success of a second notification strategy.

If the probability is above the threshold, the notification is delivered according to the first notification strategy at operation 750. If the probability is below the threshold, the notification is delivered according to the second notification strategy at operation 760. The process then ends.

In one example, the first notification strategy includes delivering the notification at a first time, and the second notification strategy includes delivering the notification at a second time. The second time can be prior to the first time. If the likelihood of success of the first strategy is above a threshold, the notification is delivered at the first time. If the likelihood of success of the first strategy is below a threshold, the notification is delivered at the second time. In some implementations, the threshold is the likelihood of successful delivery at the second time.

In another example, the first notification strategy includes delivering the notification to a first device, and the second notification strategy includes delivering the notification to a second device. If the likelihood of success of the first strategy is above a threshold, the notification is delivered to the first device. If the likelihood of success of the first strategy is below a threshold, the notification is delivered to the second device. In some implementations, the threshold is the likelihood of successful delivery to the second device.

Figure 8:
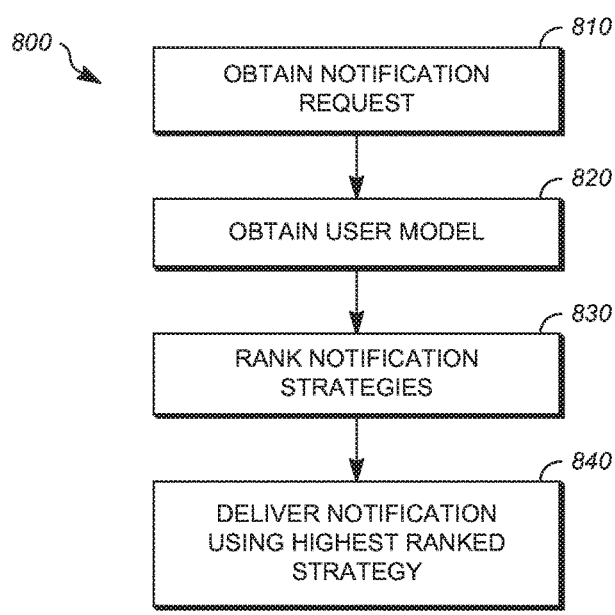
FIG. 8 is a flowchart showing a second example of a process for displaying notifications.

FIG. 8 is a flow chart showing a process 800 for displaying notifications. The operations described in connection with the process 800 can be performed at one or more computers, such as at the one or more server computers 132 of the application hosting service 130. When an operation is performed by one or more computers, it is completed when it is performed by one computer. The operations described in connection with the process 800 can be embodied as a non-transitory computer readable storage medium including program instructions executable by one or more processors that, when executed, cause the one or more processors to perform the operations. For example, the operations described in connection with the process 800 could be stored at the memory 220 of one of the server computers 132 and be executable by the CPU 210 thereof.

In operation 810, a notification request is obtained. Operation 810 can include obtaining, at one or more computers, information regarding a notification to be delivered to a device associated with a user. The notification request can, in some examples, specify any or all of a time for delivery, a device to make delivery to, or a delivery method. As an example, a notification request can be obtained as described with respect to the notification strategy chooser 330.

In operation 820, information associated with the user is obtained, such as the user model as described with respect to the user modeler 320. For example, information associated with the user can be obtained by the notification strategy chooser 330 from the user modeler 320 as previously described.

In operation 830, a plurality of notification strategies is obtained and are ranked, based on information associated with the user, such as behavior information, as described with respect to the notification strategy chooser 330. At operation 840, the notification is delivered according to the highest ranked strategy as explained, for example, in connection with the notification router 370.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition, or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method for delivering notifications to a user, comprising:
   obtaining, by one or more server computers, notification information indicating that a notification is to be delivered to a user at one of a plurality of devices associated with the user at a future time that is subsequent to a current time;
   generating, by a user modeler, behavior information associated with the user based on information received from one or more information sources, wherein the information received from the one or more information sources describes an action taken by the user, usage patterns for each of the plurality of devices associated with the user, and a geolocation history of each of the plurality of devices associated with the user;
   ranking, by the one or more server computers, a plurality of notification delivery strategies based on a probability, associated with each of the notification delivery strategies, that the user will be available at the future time to receive the notification from one of the plurality of devices associated with the user using a respective notification delivery strategy, wherein the probability for each of the notification delivery strategies is determined based on the behavior information associated with the user;
   selecting, based on a respective probability, one of the plurality of devices associated with the user to send the notification for display to;
   sending the notification for display to the selected one of the plurality of devices associated with the user based on a highest ranked notification delivery strategy from the plurality of notification delivery strategies; and
   updating a success rate associated with the highest ranked notification delivery strategy responsive to determining whether the user received the notification.

2. The method of claim 1, wherein ranking a plurality of notification delivery strategies includes ranking a first notification delivery strategy having a high probability that the user will be available at the future time to receive the notification using the first notification delivery strategy higher than a second notification delivery strategy having a low probability that the user will be available at the future time to receive the notification using the second notification delivery strategy.

3. The method of claim 2, further comprising:
   obtaining information describing success or failure of previous notification deliveries, wherein determining the probability for each notification delivery strategy is based further in part on the information describing success or failure of previous notification deliveries.

4. The method of claim 3, further comprising:
   receiving information from the selected one of the plurality of devices associated with the user that the user interacted with the notification; and
   updating the success or failure of previous notification deliveries based on the received information.

5. The method of claim 1, wherein the behavior information includes mobility patterns for the user.

6. The method of claim 1, wherein the behavior information includes geolocation information describing a current location of the user.

7. The method of claim 1, wherein the behavior information includes information describing success or failure of previous notification deliveries.

8. The method of claim 1, wherein the behavior information includes information describing usage of each of the plurality of devices by the user.

9. The method of claim 1, wherein the plurality of notification delivery strategies includes at least a first notification delivery strategy that causes delivery of the notification to the selected one of the plurality of devices associated with the user at a time between the current time and the future time.

10. The method of claim 1, wherein the plurality of notification delivery strategies includes at least a second notification delivery strategy that causes delivery of the notification to an alternative one of the plurality of devices associated with the user.

11. The method of claim 1, wherein the ranking of the plurality of notification delivery strategies is further based on a number of notifications delivered to the user using a delivery method associated with a respective notification delivery strategy and within a certain timeframe.

12. The method of claim 11, wherein the delivery method is one of a pop-up message, SMS, and email.

13. The method of claim 1, wherein the plurality of notification delivery strategies includes a first notification delivery strategy for delivering the notification to a first device of the plurality of devices and a second notification delivery strategy for delivering the notification to a second device of the plurality of devices, and wherein the first notification delivery strategy is ranked higher than the second notification delivery strategy if the rank of the second notification delivery strategy is below a threshold.

14. The method of claim 1, wherein a notification delivery strategy of the plurality of notification delivery strategies comprises a delivery method and an alternative routing via an alternative one of the plurality of devices.

15. The method of claim 1, wherein a notification delivery strategy of the plurality of notification delivery strategies comprises a delivery time, an alternative delivery time, a delivery modality, and an alternative delivery modality.

16. The method of claim 15, wherein the delivery modality is a first system sound and the alternative delivery modality is a second system sound.

17. An apparatus, comprising:
   one or more processors; and
   one or more memory devices for storing program instructions used by the one or more processors, wherein the program instructions, when executed by the one or more processors, cause the one or more processors to:
   obtain information regarding a notification to be delivered to a user at one of a plurality of devices associated with a user at a future time that is subsequent to a current time;
   generate, by a user modeler, behavior information associated with the user based on information received from one or more information sources, wherein the information received from the one or more information sources describes an action taken by the user, usage patterns for each of the plurality of devices associated with the user, and a geolocation history of each of the plurality of devices associated with the user;
   rank a plurality of notification delivery strategies based on a probability, associated with each notification delivery strategy, that the user will be available at the future time to receive the notification using a respective notification delivery strategy, wherein the probability for each of the notification delivery strategies is based in part on the behavior information;

select, based on a respective probability, one of the plurality of devices associated with the user to deliver the notification for display to;

deliver the notification to the selected one of the plurality of devices associated with the user based on a highest ranked notification delivery strategy from the plurality of notification delivery strategies; and update a success rate associated with the highest ranked notification delivery strategy responsive to determining whether the user received the notification.

18. The apparatus of claim 17, wherein the notification includes an interface element through which the user interacts with the notification.

19. The apparatus of claim 17, wherein the rank of a notification delivery strategy is further based on information describing success or failure of previous notification deliveries.

20. The apparatus of claim 19, wherein the memory further includes program instructions executable by the one or more processors to:

receive information from each of the plurality of devices associated with the user that the user interacted with the notification; and update the information describing success or failure of previous notification deliveries based on the received information.

* * * * *